UNITED STATES PATENT OFFICE.

RUDOLF BOETTGER, OF FRANKFORT-ON-THE-MAIN, GERMANY.

IMPROVEMENT IN PROCESSES FOR BRONZING WOOD, PORCELAIN, GLASS, METAL, &c.

Specification forming part of Letters Patent No. 211,961, dated February 4, 1879; application filed November 25, 1878.

*To all whom it may concern:*

Be it known that I, RUDOLF BOETTGER, Ph. D., of the city of Frankfort-on-the-Main, Germany, have invented a new and useful Process for Bronzing Wood, Porcelain, Glass, Metal, and other materials, which process is fully set forth in the following specification.

This invention consists in the use of an improved solution for causing the bronze or other colored powder to adhere to the article to be decorated or coated.

The solution consists of a concentrated solution of soluble glass prepared with potash, or a silicate of potash, and of a strength of about 30° of Baumé's hydrometer.

The article to be bronzed or decorated is first coated with a very thin film or layer of the solution of soluble glass, which is applied by a soft paint-brush, or other suitable means, and the bronze or other powder is applied through a sieve or other means. The articles are then dried by exposure to the atmosphere or to artificial heat, after which the excess of powder that has not been absorbed by the soluble glass is removed by a brush or other equivalent.

The bronze or other powder so applied will resist the effects of heat and of washing with alcohol, or of polishing by steel or agate burnishers.

I claim as my invention—

The process of fixing bronze or other colored powder to wood, porcelain, glass, metal, and other materials, substantially as herein described, the same consisting in first coating the article with a thin film of soluble glass, and then applying thereto, before the film has become dry, the powder in a dry state by means of a sieve or duster, and then drying by exposure to the atmosphere or artificial heat.

PROFESSOR DR. RUD. BOETTGER.

Witnesses:
LOUIS BASSE,
LOUIS MASCHMANN.